United States Patent [19]

Fellows

[11] Patent Number: 4,872,371
[45] Date of Patent: Oct. 10, 1989

[54] AUTOMOTIVE TRANSMISSIONS

[76] Inventor: Thomas G. Fellows, 1 Greenbrook Avenue, Hadley Wood, Barnet, Hertfordshire EN4 OLS, England

[21] Appl. No.: 130,530

[22] Filed: Dec. 9, 1987

[30] Foreign Application Priority Data

Dec. 11, 1986 [GB] United Kingdom ................ 8629673

[51] Int. Cl.$^4$ ........................ F16H 15/00; F16H 37/06
[52] U.S. Cl. ........................................ 74/690; 74/691; 74/200
[58] Field of Search ........................... 74/691, 690, 200

[56] References Cited

U.S. PATENT DOCUMENTS

| | | | |
|---|---|---|---|
| 2,045,558 | 6/1936 | Almen et al. | 74/200 |
| 2,216,190 | 10/1940 | Erban | 74/690 |
| 3,597,358 | 8/1971 | Duling et al. | 74/200 X |
| 3,670,594 | 6/1972 | Roper | 74/689 |
| 3,739,658 | 6/1973 | Scheiter | 74/691 X |
| 3,826,148 | 7/1974 | Magill | 74/200 |
| 3,828,618 | 8/1974 | Sharp et al. | 74/200 |
| 4,272,999 | 6/1981 | de Brie Perry | 74/200 |
| 4,297,918 | 11/1981 | Perry | 74/690 |
| 4,339,966 | 7/1982 | Kraus | 74/650 |
| 4,464,952 | 8/1984 | Stubbs | 74/690 |
| 4,499,782 | 2/1985 | de Brie Perry | 74/200 |
| 4,570,501 | 2/1986 | de Brie Perry | 74/200 |
| 4,628,766 | 12/1986 | de Brie Perry | 74/691 |
| 4,638,687 | 1/1987 | de Brie Perry | 74/691 |
| 4,691,592 | 9/1987 | de Brie Perry | 74/691 |
| 4,693,134 | 9/1987 | Kraus | 74/690 |

FOREIGN PATENT DOCUMENTS

| | | |
|---|---|---|
| 2023753 | 1/1980 | United Kingdom . |
| 2100372 | 12/1982 | United Kingdom . |
| 2150240 | 6/1985 | United Kingdom ................ 74/691 |

Primary Examiner—Leslie A. Braun
Assistant Examiner—William Gehris
Attorney, Agent, or Firm—Cushman, Darby & Cushman

[57] ABSTRACT

A rotary transmission of continuously-variable-ratio type including a variator, that is to say a ratio-varying unit, and a subsequent gearing unit, the gearing unit being capable of alternative settings whereby the transmission may operate in two different regimes. The axes of rotary operation of the variator and the gearing unit are displaced from but parallel to each other, and the entire gearing unit lies between the two radial planes marking the axial extremities of the variator, which may be of the toroidal-race rolling traction type with two input discs located at opposite axially ends and a single, double-faced output member located centally between them, that member coinciding axially with the member of the gearing unit to which it is connected. The means of connection may be direct geared engagement, involving reversal of direction of rotation, or connection by chain, belt or the like involving no such reversal.

10 Claims, 3 Drawing Sheets

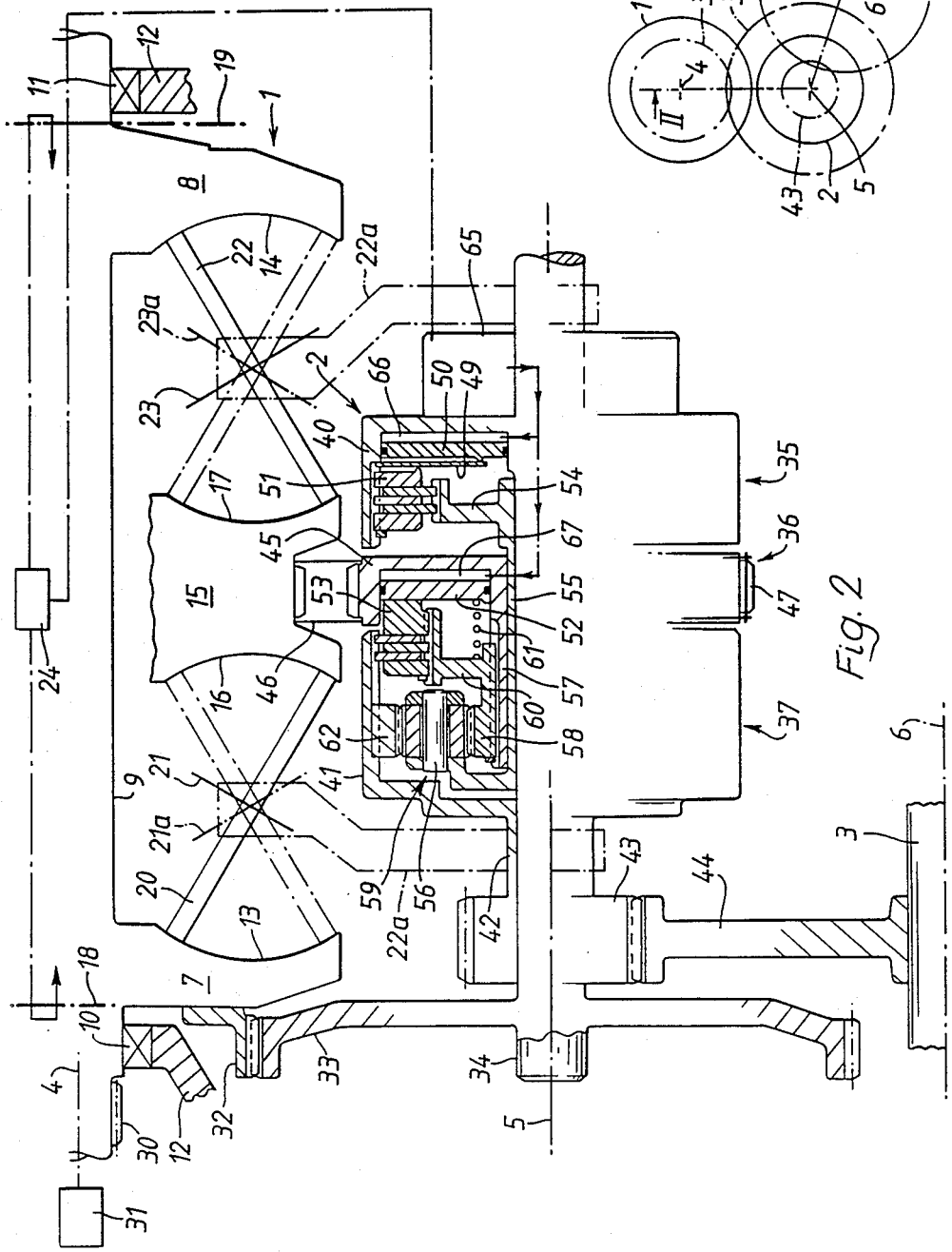

AUTOMOTIVE TRANSMISSIONS

This invention relates to automotive transmissions including a variator, by which is meant a component by the operation of which, over a predetermined ratio range, the transmitted ratio can be varied in a continuous or stepless manner. While the invention includes transmissions having variators of other kinds, it relates particularly to transmissions having variators of the toroidal race, rolling traction type.

Such transmissions customarily include a gearing unit which is driven by the variator output, which includes at least one epicyclic combination, and which is located between the variator output and the final drive, that is to say the final output member of the transmission as a whole prior to reduction to the wheels of the automobile. It is mechanically efficient and quite common practice to align the transmission and the prime mover that drives it so that the output shaft of the prime mover, the centre lines of the variator and the gearing unit, and the final drive are all coaxial. However, the total axial length of the prime mover and transmission is then so great as to present severe problems when it is required to mount the prime mover transversely in a vehicle, especially a front-wheel-drive (FWD) vehicle.

One aim of the present invention is to provide an arrangement of the variator and subsequent gearing unit of a transmission that is both mechanically simple and axially compact, and that therefore offers particular advantages in applications such as FWD vehicles. The invention applies especially to transmissions in which the gearing unit has to contain enough components and controls to enable it to be set in two different operating modes whereby the transmission as a whole can act in two different modes or "regimes+ also. Transmissions of continuously-variable ratio and cabable of operating in two regimes are well known in general, and particularly well known where a variator of the toroidal race, rolling traction type is used - see, for instance, British specifications GB 2023753C and GB 2100372C.

According to the invention a transmission of continuously-variable-ratio type includes a variator and a gearing unit each presenting an axis of operation, in which the output of the variator connects with a first input to the gearing unit, in which the gearing unit is capable of alternative settings whereby the transmission may operate in two different regimes, in which the axes of operation of the variator and the gearing unit are displaced from but parallel to each other, and in which the entire gearing unit lies between the two radial planes marking the axial extremities of the variator.

The gearing unit may include a second input for connection to the prime mover by which the transmission is driven, by-passing the variator. The gearing unit may comprise three coaxial and mutually-rotatable components, arranged in axial sequence: one of these components may be permanently connected to the first input, another to the second input, and the remaining third component may be in permanent driving connection with the final drive. The gearing unit may also contain a single epicyclic combination and two clutch-like devices operable alternately to cause the transmission to operate either in first or in second regime.

The axis of the final drive may be parallel to but displaced from the axes of both the variator and the gearing unit. The axes of the variator, gearing unit, and final drive may be located at the vertices of a triangle when viewed in a direction parallel to those three axes. The triangle may lie in a vertical plane and the axes may be horizontal with the final drive lowest.

The gearing unit may be supported in position by connection to a component of the variator. For instance, where the variator is of the toroidal race, rolling traction type, the gearing unit may be connected to the same structure that supports the carriages in which the rollers of the variator are supported.

A toroidal race, rolling traction type variator may comprise two input discs arranged at opposite axial ends of the variator and a single, double-faced disc constituting the output and located centrally between them. The variator output and the first input of the gearing unit may be so connected that they rotate in the same sense, the connection being of belt, chain or like type for instance. Alternatively the variator output and the first input of the gearing unit may be so connected that they rotate in opposite senses, for instance by being both formed as gears which engage directly with each other.

The invention will now be described, by way of example, with reference to the accompanying drawings in which:

FIG. 1 is a schematic view of a transmission, taken in a direction parallel to the axes of its principal components;

FIG. 2 is diagrammatic but more detailed, and is a larger-scale section on the line II-II in FIG. 1, and FIGS. 3 and 4 are generally similar to FIG. 2 but show alternative constructions, partly in outline.

Figure 3:
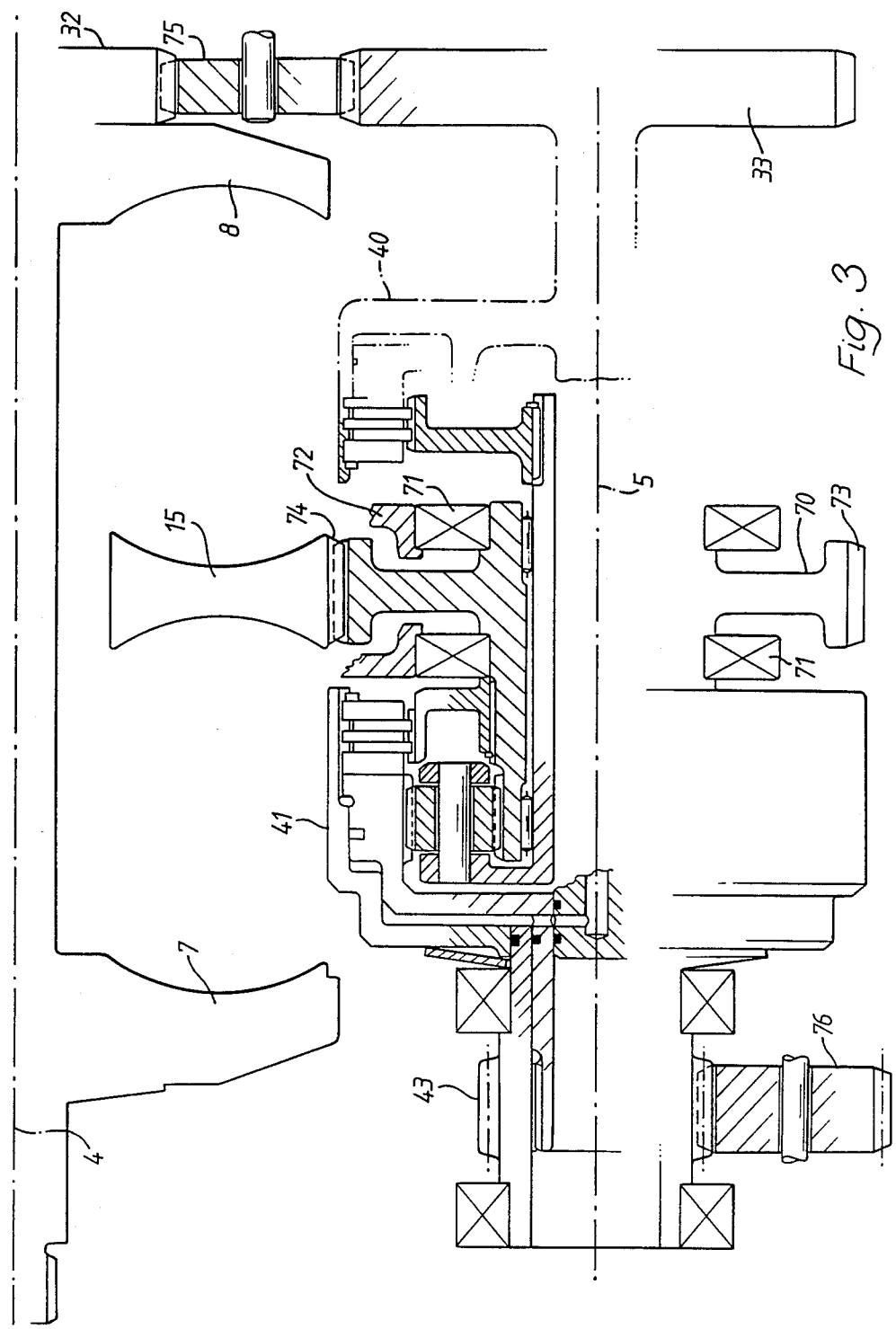

FIG. 1 schematically shows the three main elements, that is to say variator 1, gearing unit 2 and final drive shaft 3, of a transmission arranged so that their respective operating axes 4, 5 and 6 are all parallel to each other and horizontal, and lie at the vertices of a vertical triangle with axis 6 lowest. Axis 4 is highest and axis 5 in between, although this order might well be reversed in other designs.

FIG. 2 shows in outline a variator 1 of the toroidal-race, rolling traction type. It comprises two input discs 7, 8 mounted ona common input shaft 9 supported by bearings 10, 11 themselves supported by housing structure 12. Disc 7 is formed with a part-toroidal race 13 and disc 8 with a similar race 14. A single output disc 15, presenting two oppositely-facing part-toroidal races 16 and 17, is located mid-way between discs 7 and 8. It is supported by means not shown, and is rotatable about shaft 9. A set of three rollers 20 (of which one is shown), rotatable about axles 21 which are themselves pivotally mounted on fixed structure indicated in outline at 22a, provide a driving connection between races 13 and 16 and a similar set of rollers 22 rotatable about axles 23 also pivotally mounted on the structure 22a establish driving connection between races 14 and 17. The axles 21, 23 of all the rollers 20, 22 must of course be similarly inclined relative to variator axis 4, so that all the rollers transmit drive compatibly between their respective input and output races. As is well known in the art of toroidal race rolling traction transmissions, pivoting of the axes (by means well-known in the art) about their supports on structure 22a alters the transmitted ratio. When axles 21, 23 are in the position in which they are shown in full lines, their associated rollers 20, 22 make contact with their input races 13, 14 at minimum radius and with their output races 16, 17 at maximum radius: minimum speed ratio is therefore transmitted. At the other extreme, when the axles 21, 23 are in the positions in which they are shown in broken lines at 21a and 23a, the rollers make contact with their input races at maximum radius and with their output races at minimum radius, and therefore maximum speed ratio is transmitted.

While both of input discs 7 and 8 are restrained from any rotation relative to shaft 9, at least one of them is capable or limited axial movement relative to that shaft and mechanism indicated diagrammatically at 24 operates to exert an "end load+ upon discs 7 and 8, that is to say a force urging them axially together so as to generate an appropriate reaction which will permit torque to be transmitted between rollers 20, 22 and the input and output races that they connect.

Input shaft 9 of variator 1 is formed with a spline 30 for connection to the output of a prime mover (indicated schematically at 31) and also carries the first gear 32 of a reduction gear pair. The second gear 33 of this pair is carried by an intermediate shaft 34 located on axis 5 as shown in FIG. 2. Shaft 34 constitutes one input to the gearing unit 2, the other input being taken from output disc 15. Unit 2 comprises three mutually rotatable components 35, 36 and 37, all coaxial with axis 5 and mounted in axial sequence from right to left as shown in FIG. 2. Component 35 comprises a cylindrical cup 40 fixed to shaft 34. Component 37 comprises a cylindrical cup 41 integral with a sleeve 42 which is journalled around shaft 34 and which carries the first gear 43 of a reduction gear pair, the second gear 44 of which is mounted on the final drive shaft 3. The middle component 36 of gearing unit 2 includes a hollow cylinder 45 which is mounted so that it can rotate relative to and coaxial with shaft 34. Drive is transmitted without reversal of direction between output disc 15 and the outer surface of cylinder 45. As shown in FIG. 2 this is accomplished by a chain 46, and chain-teeth 47 are therefore presented by disc 15 and cylinder 45, but other means of transmitting drive without direction-reversal, such as an idler gear, are of course possible and could in appropriate cases offer advantages.

It will be appreciated that while a driving connection without direction-reversal between output disc 15 and cylinder 45 has been described, what is fundamentally required is that the two input members to gearing unit 2—that is to say cylinder 45 and shaft 34—should rotate in the same direction. This could of course alternatively be achieved by a connection with direction reverseal between disc 15 and cylinder 45, and balancing this with, say, an extra idler gear between gears 32 and 33. A further idler gear downstream of gearing unit 2, say between gears 43 and 44, can be included if required to make the direction of rotation of the final drive shaft 3 compatible with that of the prime mover 31.

An annular piston 50, working within a cylinder defined by cup 40, can bear by way of a spring 49 against a clutch member 51 and an annular piston 52, working within hollow cylinder 45, can bear against a clutch member 53. Clutch member 51 can move in and out of engagement with a rotor 54 carried on a sleeve 55 which is journalled on shaft 34 and which carries the planet carrier 56 of an epicyclic gear set 59. Cylinder 45 is connected to a sleeve 57 which is journalled to rotate about sleeve 55 and which also carries the sun gear 58 of the epicyclic set. Clutch member 53 is carried on a rotor 60 which is splined to sleeve 57 so that it rotates with that sleeve. Clutch member 53 is capable of movement into and out of engagement with the inner wall of cup 41 of the left-hand component 37 of gearing unit 2, on which the ring or annulus gear 62 of the epicyclic set 59 is mounted.

A pumping unit shown schematically at 65, connected to shaft 34 and driven by that shaft at less than prime mover speed (due to reduction gearing 32, 33) is caused by a control system (not shown, but of known type) to deliver fluid under pressure either to the working space 66 of piston 50, or to the working space 67 of piston 52. At times of transition, fluid will of course be delivered briefly to both spaces. Space 66 is pressurised when the transmission is to work in the first of its two regimes. In this regime space 67 is unpressurised, piston 52 is held out of contact with clutch member 53 by a spring 61, and clutch member 53 is itself out of engagement with cup 41. However piston 50 holds clutch member 51 in engagement with rotor 54, so the planet carrier 56 therefore rotates with cup 40 and shaft 34. Sun gear 58 is simultaneously driven by output disc 15 by way of chain 46, cylinder 45 and central sleeve 57, and the final drive shaft 3 is driven by way of reduction gearing 43, 44 by annulus gear 62, the speed of rotation of which reflects the input it receives from the interaction of the sun and the planets.

Assume that the gearing unit 2 is set as just described, with clutches 51 and 53 engaged and disengaged respectively, and that axles 21, 23 of rollers 20, 22 are in the positions in which they are shown in broken lines at 21a, 23a in FIG. 2. For a given output speed of prime mover 31, final drive shaft 3 will be rotating at maximum speed in its reverse direction. If now the inclination of the axles is progressively changed so that they move towards the opposite extreme of their angle of movement (as shown in full lines), the resultant of the unchanging speed of rotation of planet carrier 56 and the diminishing speed of rotation of sun 58 will be a steady reduction in the resultant speed of annulus gear 62 and so of shaft 3. A state will be reached, before the axles reach the opposite extreme of their angle, in which the speeds of rotation of planet carrier and sun are such that the resultant speed of the annulus gear and final drive is zero and a condition known in the art as "geared neutral+ or "geared idle+ is attained. If the axles 21, 23 then continue to move toward and finally reach their extreme, full-line position the speed of sun 58 continues to fall while that of planet carrier 56 remains unchanged, and the annulus gear 62 and final drive shaft 3 accordingly rotate with increasing speed in the opposite, that is to say forward, direction.

If the delivery of pumping unit 65 is changed so that clutch 51 is disengaged and clutch 53 engaged, then although sun gear 58 remains driven because it is permanently connected to cylinder 45, rotor 54 and planet carrier 56 are freed from restraint and the sun 58 therefore transmits no drive. The input to gearing unit 2 by way of shaft 34 is therefore now inoperative, and final drive shaft 3 is driven solely from output disc 15 by the sequence chain 46—cylinder 45—clutch 53—cup 41—sleeve 42 and reduction gearing 43, 44. As is well known in the art, by appropriate choice of gearing and variator ratios it is possible to ensure that when the engagement of clutches 51, 53 is reversed at the end of a period of operation in first regime, when the axles 21, 23 are in their full-line positions and the final drive shaft 3 is therefore rotating at the maximum forward speed of which it is capable in first regime, the instantaneous forward speed at which the shaft is driven as the second regime takes over is exactly the same. Such a change of regimes, resulting in no instantaneous change of final drive speed, is known as a "synchronous change+. If, following the adoption of second regime, the inclination of the roller axles 21, 23 is once again progressively changed, this time back towards the original broken-line extreme positions 21a and 23a, the forward speed of final drive shaft 3 rises progressively to its maximum value.

For the transmission illustrated in FIG. 2 of the drawings a synchronous change between first and second regimes can be obtained, for instance, if the gearing 32, 33 between prime mover 31 and planet carrier 56 gives 1.75:1 reduction, if the chain 46 or other connection between output disc 15 and sun 58 gives an 8:7 speed increase without direction reversal, if the epicyclic set 59 has a ratio (annulus 62/sun 58) of 2:1, and if the ratio of the variator 1 is 2:1 at the regime change point, that is to say when axles 21, 23 are in their full-line positions.

Potential advantages of a transmission as just described include the following. Firstly that power reaches the final drive shaft 3 (by way of reduction gearing 43, 44) at a location which is very close, when measured in a direction parallel to the axes of the main components of the transmission, to the connection between the spline 30 and the prime mover 31, and which is therefore near to the transverse centre of the vehicle in a typical transverse-engine, FWD vehicle installation. Secondly, that the pumping unit 65 which supplies the pressurised fluid to the clutches 51 and 53, and which may also with advantage supply the end load mechanism 24 and control circuits within the transmission, is located low in the transmission and at the opposite axial end (the right-hand end, as shown in Figure 2) of the transmission to that at which connection with the prime mover is made. It also runs slowly, due to reduction gearing 32, 33. Thirdly, that all the necesary gears and clutches of unit 2 are contained within a single and generally cylindrical cartridge defined by the exteriors of cups 40 and 41 and cylinder 45: this promotes ease of assembly and maintenance. Fourthly, rigidity and accuracy of assembly promoted by supporting the gearing unit 2 on the same fixed structure 22a on which the rollers 21, 22 of the variator 1 are pivotally supported.

Fifthly, the compactness clearly illustrated by FIG. 2, in which the length of unit 2, measured between the axial extremities of cups 40 and 41, is clearly less than the axial length of variator 1 measured between the radial planes 18, 19 marking the opposite axial extremities of input discs 7 and 8. The axial length of the variator, therefore, is the crucial determinant of the length of the transmission as a whole, because the gearing unit is not only shorter than the variator but also accommodated wholly within the same length dimension which the variator itself occupies.

Figure 4:
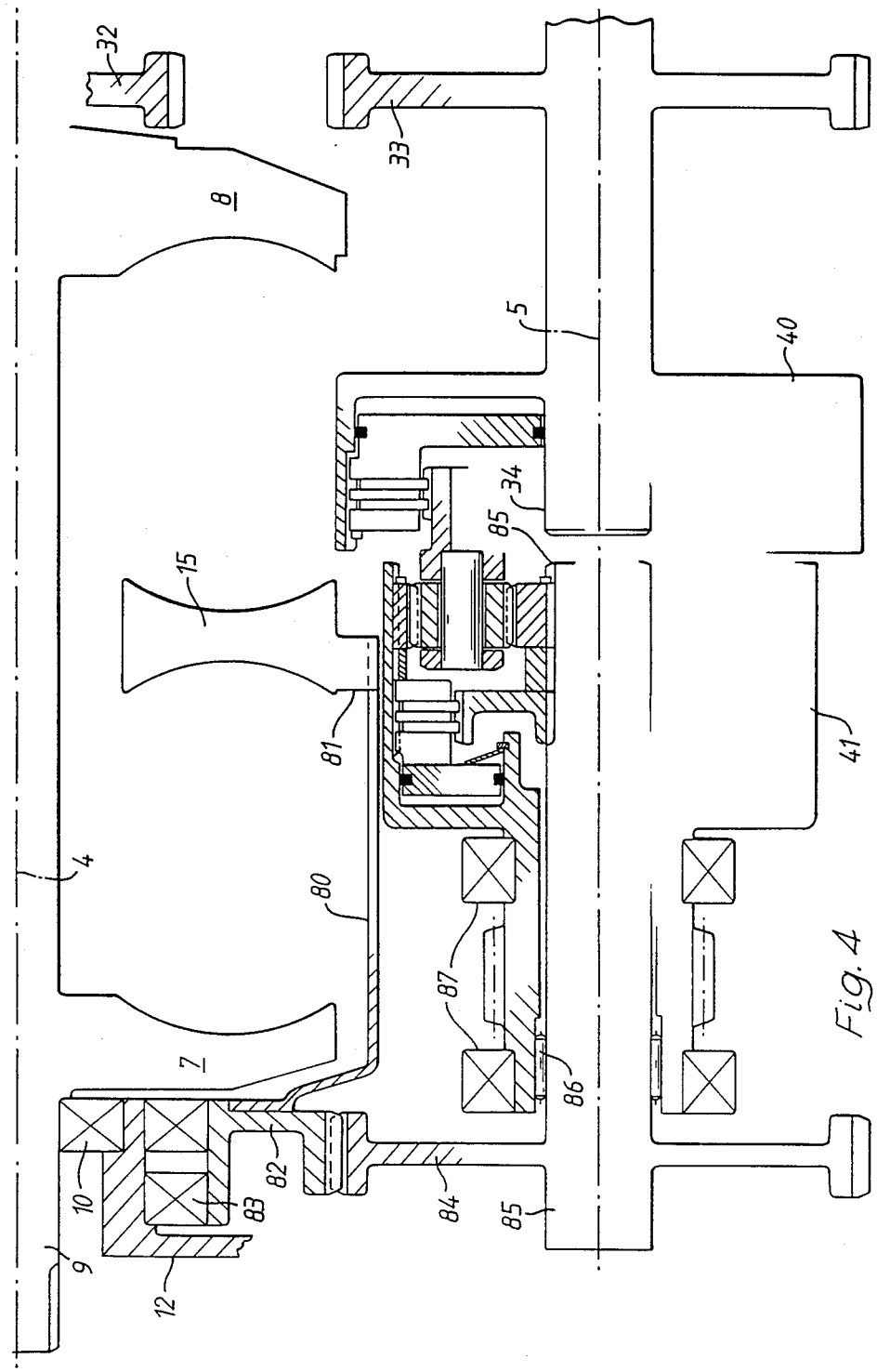

In the alternative constructions according to the invention, shown in FIGS. 3 and 4, parts performing essentially the same function as similar parts already shown in FIG. 2 are indicated by the same reference numerals. The principal difference between the constructions of FIGS. 2 and 3 is that the middle component (formerly 36) of gearing unit 2 is now a robust gear wheel 70, supported in a rotary bearing 71 mounted on fixed structure indicated in outline at 72. Teeth 73 formed on the periphery of wheel 70 engage directly with teeth 74 formed on the periphery of output disc 15. Sun gear 58 is carried by wheel 70, just as it was carried by cylinder 45 in FIG. 2, but because there is now a reversal in the direction of rotation between output disc 15 and wheel 70, a complementary reversal in the direction of rotation of planet carrier 56 must be achieved. This is done by interposing an idler gear 75 between gears 32 and 33. A further idler gear 76, between gears 43 and 44, is then one way of achieving compatibility between the directions of rotation of final drive shaft 3 and prime mover 31. The direct engagement between disc 15 and gear 70, and the extra idler 75 between gears 32 and 33, can have the additional benefit of reducing the large size which gear 33 of FIG. 2 tends to require, and the direct gear-toothed engagement between disc 15 and gear 70 may permit that gear to be axially shallower than cylinder 45, which had to be deep enough to support a chain 46 of adequate width and strength.

In the alternative construction shown in FIG. 4, the formation of teeth - whether of gear-type or chain-type - on the periphery of output disc 15 is avoided. Instead a drum 80, mounted on a flange 81 on the periphery of the disc, is connected to a gear 82 running on bearings 83 mounted on the outside of the structure 12 which houses the bearings 10 of the variator input shaft 9. Gear 82 meshes with a gear 84 carried on one end of a stub axle 85 supported by bearings 86, 87 which also support the output gear 43 of the gearing unit 2. Sun gear 58 is carried on the other end of axle 85, and planet carrier 56 is connectable, by way of clutch member 51, to cup 40 and so by way of shaft 34 to gear 33. As in FIG. 3, an idler 75 between gears 32 and 33 establishes the correct relative rotation between sun gear 58 and planet carrier 56, and an idler 76 between gears 43 and 44 achieves compatibility between the directions of rotation of prime mover 31 and final drive shaft 3.

The construction of FIG. 4 illustrates that the invention is not limited to designs in which the connection between the variator output and the first input to the gearing unit takes place in a single radial plane relative to the axes 4 and 5 of variator and gearing unit respectively. Nor is the invention limited to designs in which the first input to the gearing unit is located centrally relative to that unit. However the axial compactness of the unit 2, measured between the axial extremities of cups 40 and 41, is as apparent in FIGS. 3 and 4 as it is in FIG. 2.

I claim:
1. A transmission of continuously-variable-ratio type including a variator, presenting an axis of operation and having an input and an output;
   a gearing unit, having components including not more than a single epicyclic combination comprising a sun member a planet carrier and an annulus, said gearing unit also presenting an axis of operation and having first and second inputs and output all coaxial with said axis of operation;
   a final drive shaft, presenting an axis of operation and connected to said output of said gearing unit;
   said variator output and input being connectable with said first and second inputs of said gearing unit respectively;
   said variator also presenting first and second radial planes, relative to said axis of operation of said variator and marking the axial extremities of said variator; in which said gearing unit is capable of alternative settings whereby said transmission may operate in two different regimes in at least one of which a geared neutral condition is achieved in which said final drive shaft is at rest but said components of said gearing unit are under drive, in which said axes of operation of said variator and said gearing unit are displaced from but parallel to each other, and in which the entire said gearing unit lies between said first and second radial planes.

2. A transmission according to claim 1 in which said gearing unit comprises first, second and third mutually-rotatable components, arranged coaxially and in axial sequence along said axis of operation of said gearing unit, in which said first component is associated with said first input, in which said second component is associated with said second input, and in which said third component is permanently connected to said final drive shaft.

3. A transmission according to claim 1 in which said gearing unit contains a single epicyclic combination and first and second clutch-like devices, and in which said first and second clutch-like devices are operable alternately to cause said transmission to operate in either the first or the second of said two different regimes.

4. A transmission according to claim 1 in which said axes of operation of said variator, said gearing unit and said final drive shaft are located at the vertices of a triangle, when viewed in a direction parallel to said three axes.

5. A transmission according to claim 4, arranged so that said triangle lies in a vertical plane and said axes are all horizontal, the axis of said final drive shaft lowest.

6. A transmission according to claim 1 in which said variator is of the toroidal-race, rolling-traction type, comprising first and second input discs arranged at opposite ends of said variator relative to its said axis of operation, and a single, double-faced output disc constituting said output of said variator and located centrally between said first and second input discs.

7. A transmission according to claim 6 in which said output of said variator and said first input of said gearing unit are so connected that they rotate in the same sense.

8. A transmission acccording to claim 7 in which said connection is of the type including belts and chains.

9. A transmission according to claim 6 in which said output of said variator and said first input of said gearing unit are so connected that they rotate in opposite senses.

10. A transmission according to claim 9 in which said output of said variator and said first input of said gearing unit are both formed as gears, and engage directly.

* * * * *